United States Patent [19]

Mori

[11] 4,105,267
[45] Aug. 8, 1978

[54] BEARING PROVIDED WITH OBLIQUE OIL GROOVES AND/OR WITH A PLURALITY OF OBLIQUELY ARRANGED ROWS OF SEMICIRCULAR INDENTATIONS

[75] Inventor: Sanae Mori, Nagoya, Japan

[73] Assignee: Daido Metal Company, Ltd., Nagoya, Japan

[21] Appl. No.: 775,497

[22] Filed: Mar. 8, 1977

[30] Foreign Application Priority Data

Mar. 19, 1976 [JP] Japan .................... 51-30216

[51] Int. Cl.$^2$ .............................................. F16C 33/66
[52] U.S. Cl. .................................... 308/240; 308/122
[58] Field of Search ................... 308/78, 93, 100, 106, 308/108, 121, 122, 240, 97, 98, 116

[56] References Cited

U.S. PATENT DOCUMENTS

| 1,940,301 | 12/1933 | Grobel et al. | 308/121 |
| 2,660,484 | 11/1953 | Gerard et al. | 308/122 |
| 3,169,807 | 2/1965 | Abel et al. | 308/240 |
| 3,909,087 | 9/1975 | Cairns | 308/240 |

FOREIGN PATENT DOCUMENTS 738,343  12/1932  France ..................... 308/240

*Primary Examiner*—Trygve M. Blix
*Assistant Examiner*—Charles E. Frankfort
*Attorney, Agent, or Firm*—Karl W. Flocks

[57] ABSTRACT

An improved bearing provided with either one or two or more of an oil groove, oil indentation, oil indent pattern and the like formed in the internal surface of a semi-circular cylindrical bearing or semi-circular bearing component. The sum of the lengths, measured on the internal surface, of the formed oil groove, oil indentation or the like appearing in any cross section of main loaded area in the axial direction being made to be 5 - 50% of the width of the bearing enables a smooth swinging or rocking motion of the shaft by allowing an oil film or the like to always be formed on the main loaded area while preventing early fatigue failure.

5 Claims, 15 Drawing Figures

BEARING PROVIDED WITH OBLIQUE OIL GROOVES AND/OR WITH A PLURALITY OF OBLIQUELY ARRANGED ROWS OF SEMICIRCULAR INDENTATIONS

BRIEF SUMMARY OF THE INVENTION

The present invention concerns in general an improvement in the surface configuration of a main load carrying portion of bearings. More specifically, it is concerned with improvements in the configuration of oil grooves, oil indentations, oil indent patterns and the like formed in the internal surfaces of circular or semicircular cylindrical bearing, particularly those bearing that are suited to receive swinging or rocking motions such as in the case of crosshead pin bearings of a large marine diesel engine.

The conventional crosshead pin bearings have the construction as shown in FIG. 1 through FIG. 4. FIG. 1 is a perspective view showing a conventional crosshead pin bearing; FIG. 2 is a development thereof; and FIG. 3 and FIG. 4 are developed views, each showing a different form of groove. As shown in these figures, in the internal surfaces 1 are formed a plurality of grooves 2 in the axial direction and perpendicular to the circumferential direction (the slip direction of rotational motion or the sliding direction) and a plurality of oil holes 3 and as in the cases of FIG. 3 and FIG. 4, a groove or grooves 21 are formed in the circumferential direction so as to be connected in communication with the grooves 2 in the axial direction and oil holes 3, thus lubricating oil is passed through these grooves and holes. Such a configuration in which the grooves in the axial direction are made perpendicular to the slip direction of the swinging motion has the defect that an excessive Hertz's stress is put on the areas in the vicinity of the grooves in the axial direction at the time of the metal-to-metal contact, which in turn, in the early stage, tends to cause flowing, crushing, fatigue failure and cracking of the portions near the edges 4 of the grooves.

An object of this invention is to eliminate the causes of the above-mentioned failures and to prevent at the same time fatigue failure and crushing of such bearings where it is difficult to form an oil film or where absolute prevention of seizure due to shortage of lubricant is desired. These objects are accomplished by providing as much lubricating area (oil grooves, oil cavities, oil holes and the like) as possible which is kept in constant contact with the shaft in any cross sections at area in the axial direction of the main load supporting part, by eliminating leakage of the lubricant to the axial ends (i.e. to maintain hydraulic pressure) and by concurrently keeping Hertz's stress to a minimum level even if oil film formation is obstructed. Particularly an object of this invention is to offer a crosshead type bearing for a large marine diesel engine having an excellent non-seizure performance.

Another object of this invention is to offer plain metal bearing applicable to internal combustion engines for automobiles that make a rotational motion and also in engines for agricultural use.

A further object of this invention is to offer plain bearing (also applicable as bushings) that are also effectively applicable to general industrial machines, etc.

Now this invention will be explained with respect to two separate aspects, namely, the first aspect and the second aspect.

The first aspect is characterized by that, when forming either one or two or more of the oil passages such as oil grooves, oil indentations, oil indent patterns and the like in the internal surface of a semicircular cylindrical bearing,
  (1) they are kept apart from both circumferential ends of the bearing,
  (2) the portions for said formation extend over the inner surface range determined by the angles of circumference in the circumferential direction above 60° and below 150°,
  (3) they are kept apart from both axial ends of the bearing, and
  (4) the sum of the surface lengths, in any cross section in the axial direction, of the portions for said passage formation is more than 5% but less than 50% of the width of the bearing.

The second aspect is characterized by that, in forming either one or two or more of the oil grooves, oil indentations, oil indent patterns and the like in the internal surface of a semicircular cylindrical bearing,
  (1) the portions for said passage information are connected or run out to either one side or both sides in the circumferential direction,
  (2) the portions for said formation are connected or run out to either one side or both sides in the axial direction, and
  (3) the sum of the surface lengths, measured in any cross section in the axial direction, of the portions for said formation is more than 5% but less than 50% of the width of the bearing.

In said first aspect, the reason for keeping the oil grooves, oil indentations, oil indent patterns and the like at a certain distance away from both circumferential ends and axial ends is to prevent the lubricating oil supplied on the sliding surfaces from leaking out of the bearing and thereby to maintain a necessary oil pressure. The reason for limiting the cross sectional length in the axial direction of said oil grooves, oil indentations, oil indent patterns and the like with respect to the width of the bearing is, if it is less than 5%, it tends to hamper a smooth supply of lubricating oil when an oil film is not yet completely formed, and this shortage of oil supply causes the generation of extreme heat that would induce an extraordinary wear and hence seizure. On the other hand, when it is more than 50%, however, strong the bearing it is possible that it cannot avoid becoming weak in load bearing strength due to the excessive decrease in the load bearing surface area in spite of the improvement in non-seizure characteristics. The lowering of the load carrying strength will have a particularly serious influence in the case of a crosshead pin bearing for a large diesel engine which makes rotational motions while bearing a heavy load.

There are various kinds of embodiments in which one or two or more of the oil grooves, oil indentations, oil indent patterns and the like are formed in the internal surfaces of bearing in accordance with the first and second aspects, but the preferred embodiments are as follows: the oil grooves, oil indentations, oil indent patterns or the like are formed either obliquly with respect to the axial direction or in a diagonally crossed pattern or the oil indentations, for instance, may be formed in a semi-spherical indentation. Also within the limits of not obstructing the objects, functions and constructions of the first aspect, the oil grooves, oil indentations, oil indent patterns and the like may be enlarged in the circumferential direction or may be extended to the axial ends, depending on the convenience in (1) lubrication and cooling (2) discharge of foreign particles and shedding of metal powder and (3) the method of manufacturing the bearing.

DETAILED DESCRIPTION

Figure 1:
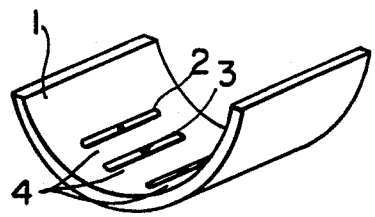
FIG. 1 is a perspective view showing an example of a conventional crosshead pin bearing.

Referring now to the drawings, good examples of the embodiments of the first aspect of the invention are described in detail.

Figure 5:
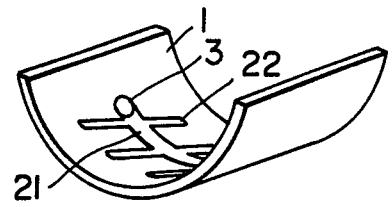
FIG. 5 is a perspective view, illustrating the first embodiment of a crosshead pin bearing in accordance with this invention.
Figure 2:
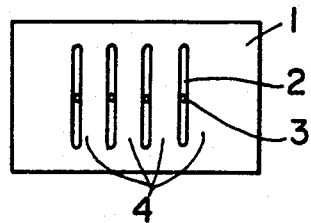
FIG. 2 is a development of the bearing of FIG. 1.
Figure 6:
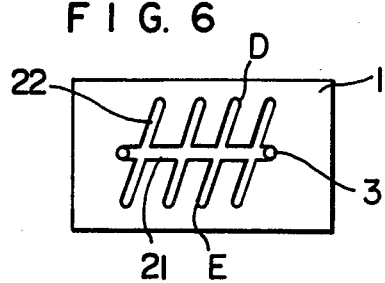
FIG. 6 is a development of FIG. 5.
Figure 3:
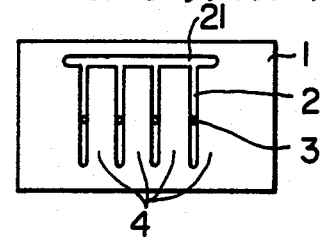
FIG. 3 and FIG. 4 are views in development, showing the grooves of different forms from that shown in FIG. 1.

FIG. 5 is a perspective view, showing a crosshead pin bearing for a large diesel engine, and FIG. 6 is a development thereof. The dimensions for said crosshead pin bearing for large size diesel engines are normally 450 – 830 mm in outside diameter and 120 – 400 mm in bearing width. In this enbodiment, however, a smaller-sized bearing with outside diameter of 110 mm and a bearing width of 40 mm was made for convenience in testing for which it was used. In FIG. 5 is the internal surface of bearing alloy with a steel backing. 21 is a circumferential groove formed at right angles to the axial direction, 22 is a groove formed oblique to the axial direction and is connected with the circumferential groove 21. 3 is an oil indentation formed in the circumferential groove 21.

Figure 13:
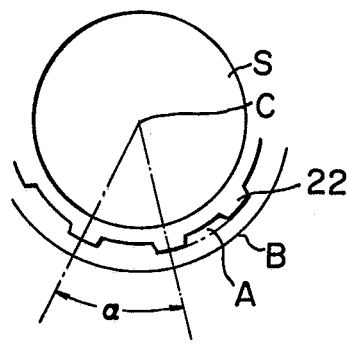
FIG. 13 is a cross sectional view on a smaller scale, showing the relationship between a shaft and the bearing of this invention.
Figure 15:
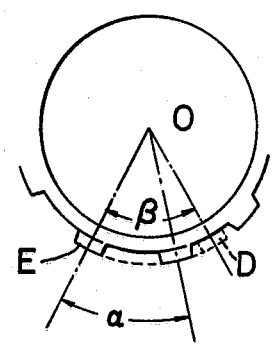
FIG. 15 is a front view showing the relationship between the angles $\alpha$ and $\beta$.
Figure 14:
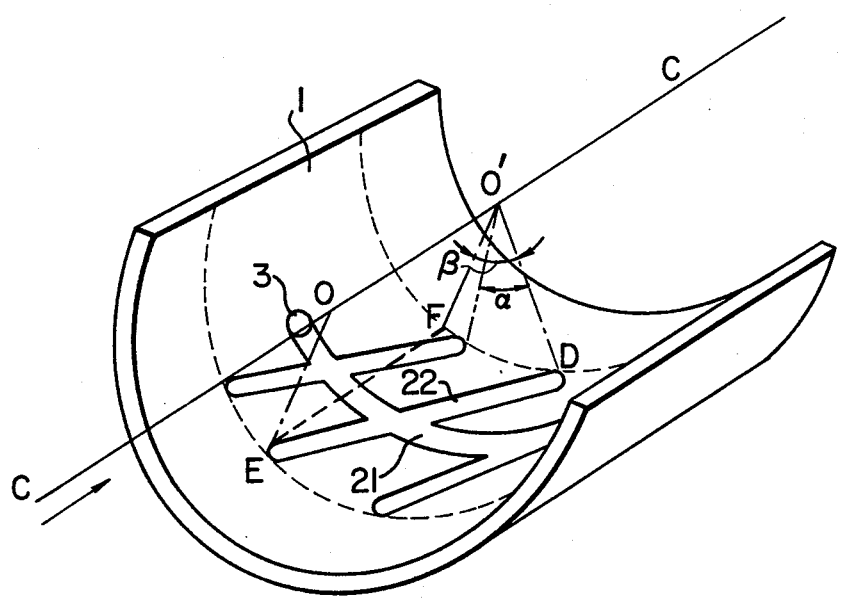
FIG. 14 is a perspective view illustrating the circumferential angle $\alpha$ and the apparent angle of inclination $\beta$ with respect to the two adjacent grooves and two opposite ends of a single oil groove.

As shown in FIGS. 13, 14 and 15, $\alpha$ is the angle of circumference represents the spacing of the two grooves adjacent to each other on the inside circumference and is generally equal to the swing angle. $\beta$, as shown in FIGS. 14 and 15 is the apparent angle of inclination at the circumference between the two opposite ends D and E of the oil groove 22 seen from the axial direction. In other words angle $\beta$ represents in what extent the groove DE is formed inclined or oblique on the cylindrical inside surface with respect to the axial direction.

This will be explained in more detail by referring to FIG. 14 and FIG. 15.

Assuming two circles both perpendicular to the axis C—C of the semi-circular cylindrical bearing, the one passes one end E of groove 22 and the other passes opposite end D of the groove 22, then the centers of the respective two circles O and O' lie on the axis C—C and, OE and O'D, respectively, is the radius of the two circles.

If this bearing is seen along axis C—C, the centers O and O' overlap each other and the two radii OE and O'E, form an apparent angle of circumference $\angle EOD$ ($\beta$), this is called an angle of inclination.

Alternatively, angle $\beta$ also can be explained in the following manner, when the radius EO is pararelly moved along the axis C—C until center O overlaps with the other center O', point E comes to point F on the circle 0', thus angle of circumference, $\angle FO'D$ ($\beta$), becomes equal to the apparent angle of circumference mentioned above and can be defined as an angle of inclination which represents the extent of inclination of groove 22 with respect to the axial direction.

In FIG. 13, S is a shaft, A denotes a bearing and B a steel backing.

Figure 7:
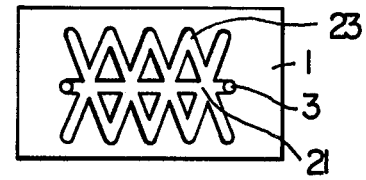
FIG. 7 through FIG. 9 are developed views, each showing a different embodiment in which the form of the grooves is different from that of the grooves in FIG. 5.
Figure 4:
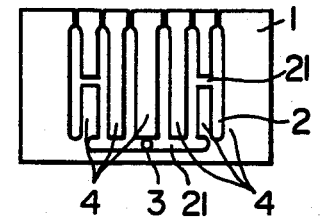
Figure 8:
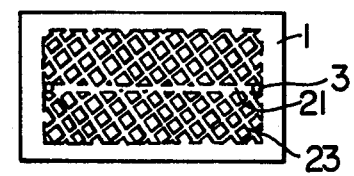
Figure 12:
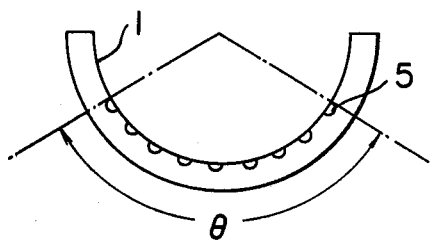
FIG. 10 through FIG. 12 show the ranges (in angle) over which the portions for forming various oil grooves and oil indentations extend.
Figure 10:
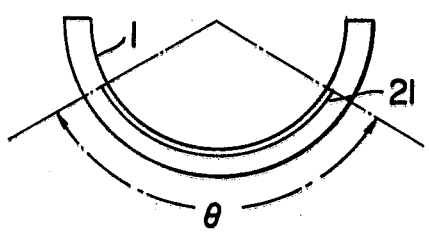
Figure 11:
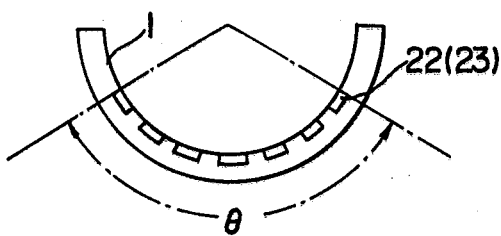

The angles $\alpha$ and $\beta$ may be set at various values, but in this embodiment, they were set within a range between 10 and 50°, and the combinations were made with said $\alpha$ and $\beta$ at various value. Angle $\theta$ in FIGS. 10, 11 and 12 stands for the range of angles for forming the whole circumferential grooves 21, oblique grooves 22, diamond-shaped grooves 23 or semi-spherically indented oil indentations 5. The more suitable angle is between 60° – 150°. Usually, aluminum alloys, copper alloys, white metal, etc. are used as bearing alloys and carbon steel is used as the backing. The oil grooves and oil cavities in the internal surface of the bearing alloy can be varied in width, depth and diameter. It is desirable, however, that the depths of the oil grooves and oil indentations are approximately equal to or more than the thickness of the bearing alloy to withstand wear, one-sided edgewised or unbalanced loading, etc. FIG. 7 is a developed view of the bearing showing the grooves in a different pattern as one of the embodiments of this invention, here the grooves 23 cross each other in a diamond pattern. FIG. 8 is also a developed view of a bearing showing another embodiment of the oil grooves 23 arranged in a further more complicated diamond than that shown in FIG. 7.

Figure 9:
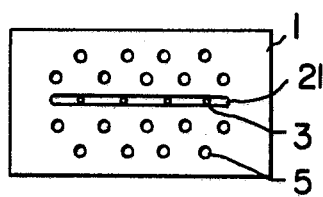

FIG. 9 is a developed view of a bearing showing still another embodiment in which 5 are oil indentations arranged independently in a diagonal or staggered manner. Here the semi-spherical oil indentations were made 1.5 – 2.5 mm in diameter and placed at intervals of 4 mm in the circumferential direction and 4.8 mm in the axial direction.

The distance from each end of the oil grooves in the axial direction, D and E, shown in FIG. 6, to the respective axial ends of the bearing is 5 mm. The distances from the ends of oil grooves and oil indentations shown in FIG. 7 through 9 to the respective axial edges are also 5 mm. The above-mentioned oil grooves, 21, 22 and 23 are all made approximately 4 mm wide and 1.5 mm deep. The thicknesses of the above-mentioned bearing alloy A and steel backing are 0.25 mm and 4.8 mm, respectively. It goes without saying that said distances and said widths and depths of oil grooves may be varied in accordance with the changes in bearing outside diameter and bearing width.

Next, a good example of the embodiment of the second aspect will be described. Although not shown in the drawing, a groove or grooves, like grooves 21 in the circumferential direction shown in FIG. 5 through FIG. 9 for the first aspect, are extended to either one side or both sides (the portions at both ends), and oil grooves like 22 and 23 and a small number of oil grooves having a sectional area smaller than that of the oil groove 22 or 23, are connected in communication with each other. The oil grooves having small sectional areas are inclined at the same angle as the inclination angle of the oil grooves 22 and 23. In other words, said grooves of smaller sectional areas lie on the extension of the oil grooves 22 and 23. The groove in the circumferential direction, leading to the edge or edges in the circumferential direction and said grooves of smaller sectional areas are provided for supplying and/or draining oil, increasing the oil amount, and/or discharging dirt without obstructing lubrication and load carrying capacity as described earlier. In this embodiment, said small grooves are made approximately 2 mm wide and 0.5 mm deep. Again it is needless to say that the size of the small grooves may be varied to appropriate dimensions depending on the bearing outside diameter and bearing width. Aside from the above-mentioned, the construction of the embodiment of the second aspect is the same as that of the embodiment of the first aspect. Numerous testings have indicated tat these constructions help spreading the lubricating oil remarkably, especially in the axial direction while ensure the bearing against premature fatigue failure. it has been found that when the apparent angle of circumference $\beta$ is equal to or greater than the angle of circumference $\alpha$ ($\beta \geq \alpha$), a point of contact of the shaft is always kept contact with the oil grooves (during one cycle), and therefore, the oil lubrication and cooling effect are improved. It has also been ascertained that a satisfactory effect can be attained even if the angle $\beta$ is smaller than the angle $\alpha$ ($\beta < \alpha$). In the case of the latter, however, the use of the grooves in combination with aforesaid semi-spherical (or pole indented) indentations is desirable. It has been also confirmed that the bearing according to the second aspect accomplish more or less the same effect as bearing according to the first aspect. The numbers of oil grooves, semi-spherical oil indentations, and oil indent patterns, their positions and spacings, the angles $\alpha$ and $\beta$, etc. in the drawing shall be interpreted as illustrative purpose only and shall not be deemed as limitative of the invention. In the embodiments according to the first aspect shown in FIG. 5 through FIG. 13, the values for the aboveidentified angles $\alpha$ and $\beta$ were specifically set at 10° - 50° but these values may be varied more widely. What is important is that the length of bearing surface at any cross section in the axial direction in the main loaded portion is more than 50% but not greater than 95% of the main loaded part. In other words, the sum of the surface lengths of the oil grooves, oil indentations and oil indent patterns in any axial cross section should be more than 5% and less than 50% of the width of the bearing. That is, if a bearing of such structure is used as a bearing that receives rotational motion while bearing heavy and fluctuating loads, for instance, as a crosshead pin bearing for a large marine diesel engine, it can be serviceable, in spite of the severe metal to metal contact, for a long period of use without causing early fatigue failure by maintaining necessary oil pressure and keeping the oil film always formed over the main loaded part and thereby making the rotational motion of the shaft smooth.

The bearing having the first aspect as shown in FIG. 5 through FIG. 12 or bearing according to the second aspect were placed in comparison with the bearing having the conventional forms as shown in FIG. 1 but having the same outside diameter and the same width as those of the embodiments of this invention under various test conditions. The result was that while the bearing of conventional forms failed early due to failures such as flowing, crushing, fatigue and seizure, the bearing having either the first aspect or the second aspect showed excellent non-seizure quality and endured a long period of use. The bearing of the present invention even made of inferior materials also endured a long period of operation.

What is claimed is

1. A semicircular cylindrical bearing having axially spaced edges and circumferentially spaced edges, said bearing comprising oil grooves disposed in a direction oblique with respect to the axial direction of said bearing on the internal surface thereof, said oil grooves terminating at a substantial distance away from the circumferentially spaced edges and from the axially spaced edges of the bearing and being disposed only substantially in the region of angle of circumference between 60°–150° so that the sum of the lengths, measured on said internal surface, of said oil grooves appearing in any cross section cut in the axial direction of the bearing is 5%–50% of the width of said bearing and the apparent angle of circumference $\beta$ formed between both longitudinal ends of said oil groove is greater than or equal to the angle of circumference $\alpha$ formed between said oil groove and the adjacent oil groove substantially parallel to that oil groove.

2. A semicircular cylindrical bearing as claimed in claim 1 wherein at least some of the grooves are further provided with an indentation at the bottom thereof.

3. A bearing as claimed in claim 1, wherein said oil grooves cross each other in a diaper pattern.

4. A bearing as claimed in claim 1, wherein said oil indentations are made in a semi-spherically indented form.

5. A semicircular cylindrical bearing having axially spaced edges and circumferentially spaced edges, said bearing comprising a plurality of indentations functioning as oil reservoirs disposed in rows oblique with respect to the axial direction on the internal surface of said bearing, said plurality of indentations terminating at a substantial distance away from the circumferentially spaced edges and from the axially spaced edges of the bearing and being disposed only substantially within the region of angle of circumference between 60°–150° so that the sum of the lengths, measured on said internal surface, of said indentations appearing in any cross section cut in the axial direction of the bearing is 5%–50% of the width of the bearing and the apparent angle of circumference $\beta$ formed between both longitudinal ends of said obliquely disposed rows of indentations is greater than or equal to the angle of circumference $\alpha$ formed between the row of said indentations and the adjacent row of indentations substantially parallel to that row.

* * * * *